United States Patent
Napchi et al.

(10) Patent No.: US 10,304,084 B2
(45) Date of Patent: May 28, 2019

(54) REAL-TIME MONITORING OF ADS INSERTED IN REAL-TIME INTO A WEB PAGE

(71) Applicant: HIRO Media Ltd., Tel-Aviv (IL)

(72) Inventors: Ariel Napchi, Tel-Aviv (IL); Hed Bar-Nissan, Tel-Aviv (IL); Oded Napchi, Tel-Aviv (IL); Alan Oken, RaAnana (IL); Shahar Daniel, Tel-Aviv (IL); Ronen Stern, Nes Ziona (IL)

(73) Assignee: HIRO Media Ltd., Tel-Aviv (IL)

( * ) Notice: Subject to any disclaimer, the term of this patent is extended or adjusted under 35 U.S.C. 154(b) by 0 days.

(21) Appl. No.: 15/422,490

(22) Filed: Feb. 2, 2017

(65) Prior Publication Data
US 2018/0012256 A1    Jan. 11, 2018

Related U.S. Application Data

(60) Provisional application No. 62/358,607, filed on Jul. 6, 2016.

(51) Int. Cl.
*G06Q 30/02* (2012.01)
*G06F 21/53* (2013.01)

(52) U.S. Cl.
CPC ..... *G06Q 30/0257* (2013.01); *G06Q 30/0277* (2013.01)

(58) Field of Classification Search
CPC ..................................................... G06Q 30/00
See application file for complete search history.

(56) References Cited

U.S. PATENT DOCUMENTS

| | | | |
|---|---|---|---|
| 8,813,236 B1* | 8/2014 | Saha | H04L 63/1408 726/22 |
| 9,009,834 B1* | 4/2015 | Ren | G06F 21/10 709/224 |
| 9,032,066 B1* | 5/2015 | Erdmann | G06F 21/53 709/224 |
| 2010/0011209 A1* | 1/2010 | Kiriansky | G06F 21/554 713/166 |
| 2016/0088015 A1* | 3/2016 | Sivan | H04L 29/06 726/23 |
| 2016/0249085 A1* | 8/2016 | Ben-Atiya | H04N 21/2547 |
| 2016/0285894 A1* | 9/2016 | Nelms | H04L 63/145 |
| 2016/0371746 A1* | 12/2016 | Lidow | G06Q 30/0275 |
| 2018/0139180 A1 | 5/2018 | Napchi et al. | |

* cited by examiner

*Primary Examiner* — Eric R Netzloff

(57) ABSTRACT

There is provided a method for monitoring of web browser media object(s) received in response to a web browser request rendering a web page, comprising: loading ad-monitoring code with the web page that includes at least one designation for placement of at least one web browser media object received in response to a web browser request by the web browser; monitoring, using the ad-monitoring code, at least one of actions and events driven by the at least one web browser media object; identifying a deviation from a set-of-rules according to an analysis of the monitored at least one of actions and events, wherein the set-of-rules define at least one of allowable and prohibited actions and events of the at least one web browser media object; and at least one of filtering and outputting an indication of the at least one web browser media object identified as deviating from the set-of-rules.

31 Claims, 6 Drawing Sheets

```
AnalyzeAndValidateAd(adObj : DisplayObject){ loaderSwfUrl = adObj.loaderInfo.url;

qualifiedClassName = getQualifiedClassName(adObj)

ValidateIfUrlAndClassArePermitted(loaderSwfUrl, qualifiedClassName)

if (adObj.hasOwnProperty("numChildren") && root.numChildren > 0) { for (var i:int = 0; i < root.numChildren; i++) { childObj = adObj.getChildAt(i)

AddChildrenToDataTree()

AnalyzeAndValidateAd (childObj)

- If the function to instrument is a Constructor
  - create a new constructor called ProxyConstructor and use it to replace the reference to Constructor that when invoked
    - creates a new instance from Constructor
    - create a new empty proxy object
    - for each member on the instance
      - if the member is a method
        - create a new method on the proxy that when invoked
          - calls the getCallingScript() function
          - returns the value of calling the instance method with the given arguments
      - otherwise the member is a property
        - if the property is settable create a property method on the proxy that when invoked
          - calls the getCallingScript() function
          - sets the instance property with the given value
        - if the property is gettable create a property method on the proxy that when invoked
          - calls the getCallingScript() function
          - returns the value of the instance property
  - for each static member of the Constructor or class
    - if the static member is a method
      - create a new static method on the ProxyConstructor that when invoked
        - calls the getCallingScript() function
        - calls the Constructor static method with the given arguments
    - otherwise the static member is a property
      - if the static property is settable create a static property method on the ProxyConstructor that when invoked
        - calls the getCallingScript() function
        - sets the Constructor static property with the given value
      - if the static property is gettable create a static property method on the ProxyConstructor that when invoked
        - calls the getCallingScript() function
        - returns the value of the Constructor static property
  - Replace the reference to Constructor with ProxyConstructor
- Otherwise if the function to proxy is a normal function
  - Create a new proxyFunction that when invoked
    - calls the getCallingScript() function
    - returns the value of calling the original function with the given arguments
  - Replace the reference to the original function with the proxyFunction

FIG. 5

REAL-TIME MONITORING OF ADS INSERTED IN REAL-TIME INTO A WEB PAGE

RELATED APPLICATION

This application claims benefit of priority under 35 USC 119(e) of U.S. Provisional Patent Application No. 62/358,607 filed on Jul. 6, 2016, the contents of which are incorporated herein by reference in their entirety.

FIELD AND BACKGROUND OF THE INVENTION

The present invention, in some embodiments thereof, relates to online advertisements and, more specifically, but not exclusively, to systems and methods for monitoring and blocking of web page advertisements.

SUMMARY OF THE INVENTION

According to an aspect of some embodiments of the present invention there is provided a computer-implemented method for monitoring of web browser media object(s) received in response to a web browser request at a web browser rendering a web page, the method executed by at least one processor of a client terminal in network communication with a web server hosting the web page, the method comprising: loading by a web browser running on the client terminal, ad-monitoring code with the web page, wherein the web page includes at least one designation for placement of at least one web browser media object received in response to a web browser request by the web browser; monitoring, using the ad-monitoring code, at least one of actions and events driven by the at least one web browser media object;

identifying a deviation from a set-of-rules according to an analysis of the monitored at least one of actions and events, wherein the set-of-rules define at least one of allowable and prohibited actions and events of the at least one web browser media object; and at least one of filtering and outputting an indication of the at least one web browser media object identified as deviating from the set-of-rules.

Optionally, the method further comprises transmitting at least one virtual message to the at least one web browser media object in response to the at least one of actions and events, wherein the at least one virtual message is designed to simulate a response to the at least one web browser media object that is different than a real response, to prevent the deviation from the set-of-rules.

Optionally, the at least one web browser media object is a programmatic advertisement provided by an ad-server for dynamic loading with the web page by the web browser.

Optionally, the web page includes a plurality of designations each for placement of at least one web browser media object, wherein the web page includes a plurality of ad-monitoring code instruction instances each for loading with an associated respective web browser media object, wherein the monitoring is performed by each ad-monitoring code instance of the associated respective web browser media object, and wherein the identification of the deviation of each respective web browser media object is performed according to a respective set-of-rules defined for each respective web browser media object.

Optionally, each ad-monitoring code instance monitors the associated respective web browser media object without monitoring other content of the web page or other web browser media objects being monitored by other ad-monitoring code instances. Alternatively or additionally, each ad-monitoring code instance and associated web browser media object are loaded together within a respective frame of the web page, wherein the ad-monitoring code instance monitors the associated web browser media object within the respective frame. Optionally, the set-of-rules define the maximum loaded size of the web browser media object, and identifying comprises identifying a deviation above the maximum loaded size of the loaded web browser media object.

Optionally, the set-of-rules define undesired parameters leading to a degradation of a user experience of a user using the web browser to access the web page.

Optionally, the set-of-rules includes at least one member of the group consisting of: statistically significant network usage, statistically significant processing resource utilization, statistically significant user noticeable slow-down in loading of the web page, statistically significant user noticeable slowdown in execution of other applications running on the client terminal, and detection of malware.

Optionally, monitoring comprises recursively monitoring loading of sub-frames within a loaded parent frame of the web page, and recursively monitoring the web browser media object within the loaded sub-frame and parent frame.

Optionally, monitoring comprises monitoring to detect changes to the document object model (DOM) of the web page. Optionally, the method further comprises an instrumentation layer that analyzes actions that attempt to perform the changes to the DOM, and at least one of: allowing actions that do not violate the set-of-rules to pass to the DOM, blocking actions that violate the set-of-rules, and providing a virtual DOM that simulates the DOM, the virtual DOM provides responses to the detected changes to allow the at least one web browser media object to operate while preventing violations of the set-of-rules.

Optionally, monitoring comprises monitoring network activity associated with the monitored web browser media object.

Optionally, the set-of-rules is designed to detect at least one member of the group consisting of: web browser media object associated with an advertiser bot, frequency capping, and re-targeting.

Optionally, the set-of-rules define prohibited activity as activation of sound by the web browser media object.

Optionally, monitoring comprises identifying the at least one of actions and events driven by each component of the web browser media object to identify which certain component of the web browser media object caused the deviation from the set-of-rules.

Optionally, monitoring comprises monitoring each technological platform implementation of the web browser media object. Optionally, the technological platform implementation includes at least one member of the group consisting of: at least one programming language used to create the web browser media object, DOM representation of the web browser media object, interface used by the web browser media object, and network activity due to the web browser media object.

Optionally, monitoring comprises creating a call chain of components of each web browser media object. Optionally, the call chain is created by analyzing call stacks to identify the connectivity between the components of the web browser media object.

Optionally, monitoring comprises adding an event handler that detects a mutation event to a DOM of the web page and analyzing a stack trace to determine a component of an web browser media object associated with code that caused the mutation.

Optionally, the web browser media object includes a plurality of links to a plurality of resources located on at least one remote server, wherein the resources include instructions for execution by the web browser of the client terminal, wherein the resources are arranged in a hierarchy such that a first resource includes instructions to execute at least one second resource, wherein monitoring comprises tracking loading of each of the plurality of resources and creating a dependency graph representing the loading relationship between resources, wherein nodes of the graph represent web browser media object resources.

Optionally, tracking loading comprises at least one member selected from the group consisting of: time of loading relative to the start of the loading process of the web page, the location of the web browser media object resource in the web page relative to the root of the web page. Optionally, the dependency graph includes weights assigned between nodes of the graph representing at least one of the loading time and distance based on the location.

Optionally, the loading relationship of resources of web browser media objects of the web page are analyzed for each loading session of the web page and added to a common graph created for the web browser media object representing an average of weights based on multiple sessions.

Optionally, the method further comprises applying a machine learning method to the graph to identify web browser media object-resources violating the set-of-rules.

Optionally, the method further comprises blocking the at least one web browser media object identified as deviating from the set-of-rules by automatically removing the designation for requesting the at least one web browser media object from the code of the web page.

According to an aspect of some embodiments of the present invention there is provided a system for monitoring web browser media object(s) received in response to a web browser request at a web browser rendering a web page, comprising: a client terminal, comprising: a network interface for connecting to a network; a program store storing code; and a processor coupled to the network interface and the program store for implementing the stored code, the code comprising: code to load ad-monitoring code with the web page, wherein the web page includes at least one designation for placement of at least one web browser media object received in response to a web browser request by the web browser; code to monitor, using the ad-monitoring code, at least one of actions and events driven by the at least one web browser media object, and to identify a deviation from a set-of-rules according to an analysis of the monitored at least one of actions and events, wherein the set-of-rules define at least one of allowable and prohibited actions and events of the at least one web browser media object; and code to at least one of filter and output an indication of the at least one web browser media object identified as deviating from the set-of-rules.

Optionally, the system further comprises a monitoring server in network communication with the client terminal, the monitoring server comprising a program store storing code, and a processor coupled to the program store for implementing the stored code, the code comprising: code to receive data from the client terminal indicative of the tracking of the loading of each of a plurality of resources of the web browser media object, and code to create a dependency graph for the web browser media object representing the loading relationships between the plurality of resources.

According to an aspect of some embodiments of the present invention there is provided a computer program product comprising a non-transitory computer readable storage medium storing program code thereon for implementation by at least one processor of a client terminal in network communication with a web server hosting a web page, for monitoring at least one web browser media object received in response to a web browser request at a web browser rendering the web page, comprising: program instructions to load by the web browser, ad-monitoring code with the web page, wherein the web page includes at least one designation for placement of at least one web browser media object received in response to a web browser request by the web browser; program instructions to monitor, using the ad-monitoring code, at least one of actions and events driven by the at least one web browser media object; program instructions to identify a deviation from a set-of-rules according to an analysis of the monitored at least one of actions and events, wherein the set-of-rules define at least one of allowable and prohibited actions and events of the at least one web browser media object; and program instructions to at least one of filter and output an indication of the at least one web browser media object identified as deviating from the set-of-rules.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIG. 4 is an example of ad-monitoring code that detects recursive loading of components of the web browser media object(s), in accordance with some embodiments of the present invention;

FIG. 5 is an example of pseudo-code for creating an instrumentation constructor function implementation that monitors the stack trace, in accordance with some embodiments of the present invention.

DESCRIPTION OF SPECIFIC EMBODIMENTS OF THE INVENTION

Figure 1:
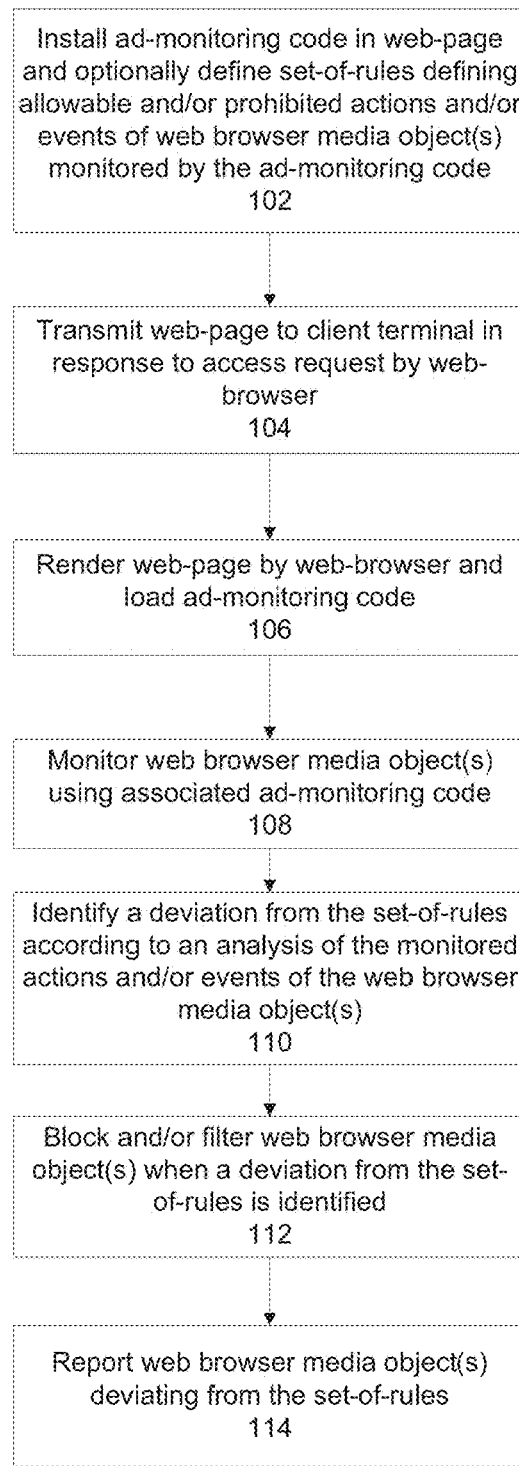
FIG. 1 is a flowchart of a method of monitoring web browser media object(s) in a web page using monitoring-code located within the web page, in accordance with some embodiments of the present invention.

The present invention, in some embodiments thereof, relates to online advertisements and, more specifically, but not exclusively, to systems and methods for monitoring and blocking of web page advertisements.

An aspect of some embodiments of the present invention relates to systems and/or methods (e.g., implemented by a processor executing code stored in a storage device) that use monitoring-code loaded with a web page to monitor and optionally control web browser media object(s) received in response to a browser request at a browser rendering the web page. The monitoring-code monitors events and action driven by the web browser media object(s), for example in response to a transmission of ad requests to an ad-server. The monitoring and control of the web browser media object(s), for instance programmatic ads, is optionally based on a set-of-rules that defines allowable and/or prohibited behavior of a web browser media object. The set-of-rules may represent a whitelist defining allowable behaving and/or a blacklist defining prohibited behavior. The set-of-rules may define undesired parameters that may lead to a degradation of the user experience, for example, a slowdown in the functioning of the browser and/or a slowdown in the computer, which may be due to, for example, increased processor utilization by the web browser media object(s). The set-of-rules may define undesired parameters defining a behavior of the web browser media object(s) that decreases performance of the client terminal and/or lead to a degradation in experience of the visitor to the web page, for example, network traffic created by the web browser media object(s), sound and/or video activated by the web browser media object(s), and web page space occupied by the web browser media object(s). Web browser media object(s) which are determined to deviate from the set-of-rules may be designated, reported, and/or blocked. The monitoring-code performing real-time monitoring of the web browser media object(s) may detect real-time deviations from the set-of-rules (e.g., a real-time degradation in user experience of a visitor to the web page according to the undesired parameters) which may not otherwise be possible using non-real time methods, for example, traffic simulations and/or manual auditing. The web browser media object(s) being monitored may otherwise be granted permission to be loaded by the web browser, based on the assumption that the web browser media object(s) adheres to (i.e., does not deviate from) the set-of-rules. The real-time monitoring of the web browser media object(s) may detect when the web browser media object(s) deviates from the set-of-rules. The real-time monitoring of the browser media object(s) may detect real-time deviations from the set-of-rules due to, for example, operation of advertising bots, previously unknown ads selected by the ad-server, frequency capping, re-targeting, and/or other dynamic advertising methods that may not allow for accurate prediction of the web browser media object(s) inserted in real-time. Web browser media object(s) and/or web browser media object(s) components that deviate from the set-of-rules may be selectively filtered (and/or reported), while web browser media object(s) and/or web browser media object(s) components that adhered to the set-of-rules are allowed to continue execution.

The monitoring-code may monitor the web browser media objects within the web page. Alternatively or additionally, each of multiple instances of monitoring-code monitors respective web browser media object(s). Each instance of monitoring-code may be loaded within a frame of the web page designated for hosting a certain web browser media object(s). Each frame that is loaded by the browser triggers execution of the monitoring-code instance to monitor the web browser media object(s) loaded within the frame.

Each web browser media object may include one or more components which may be provided by the server delivering the web browser media object or may be provided by another server. The components may trigger activation of other components in a chain reaction, which may be recursive or iterative. The deviation from the set-of-rules may be caused by activity of one or more components, even when the remaining components adhere to the set-of-rules. Identification and blocking of the problematic component while allowing the remaining components to execute may result in adherence to the set-of-rules by the web browser media object. For example, sound (which deviates from the set-of-rules) in a video advertisement may be automatically blocked while the video continues to play (adhering to the set-of-rules). In another example, a component of an advertisement web browser media object is identified as transmitting data at a high rate to a remote server (activity which deviates from the set-of-rules). The network transmitting component may be selectively blocked while allowing the remaining components of the advertisement to continue executing (while adhering to the set-of-rules).

Optionally, the monitoring-code creates a data structure that defines a call chain of components of each web browser media object, for example, a dependency graph wherein each node represents a respective component of the web browser media object and edges (optionally directed) represent the calling relationship between the components. Edges may be assigned weights based on one or more parameters, for example, time to execute the component, and/or location within the web browser media object(s). The components may be located in one or more remote-servers. The call chain may be hierarchical and/or iterative and/or recursive, in which one component calls one or more other components. When the web browser media object is identified as deviating from the set-of-rules, the call chain may be analyzed to identify the one or more components that are responsible for deviation from the set-of-rules. The certain responsible component may be blocked (and/or reported), while allowing the remaining components to continue executing. The remaining components may be monitored for deviation from the set-of-rules.

The systems and/or methods described herein provide a technical solution to the internet-centric technical problem of monitoring web browser media object(s) that are received in response to a web browser request at a web browser rendering a web page. The received web browser media object(s) may degrade performance of the client terminal and/or of the user experience of the user visiting the web page. The received web browser media object(s) may not be known or predicted in advance by the browser. The systems and/or methods described herein solve an internet-centric problem with a solution necessarily rooted in computer technology, by providing a network-based solution that includes monitoring-code that is loaded with the code of the web page that is rendered by the web browser, and optionally a monitoring server that communicates with the monitoring-code executed by the client terminal.

The systems and/or methods described herein improve performance of computers (e.g., client terminal(s), web server) and/or a network (e.g., connecting the client terminal(s) and web server), by identifying problematic web browser media object(s) and/or web browser media object(s) components and/or web browser media object(s) resources that cause degradation of the performance of the client terminal and/or degradation of the user experience for users visiting the web page hosted by the web server. The web browser media object(s) may degrade performance, for example, of the client terminal by causing high CPU usage, of the network by increasing network traffic, slow down the client terminal and/or browser, and/or lead to the introduction of malware to the client terminal. Filtering the identified problematic web browser media object(s) and/or blocking the web browser media object(s) component improves performance.

The systems and/or methods described herein create new data in the form of a dependency graph (or other implementation) that represents links and/or hierarchical relationships between components and/or resources of the web browser media object(s). The graph may be analyzed to identify which component(s) led to deviation from the set-of-rules.

Accordingly, the systems and/or methods described herein are necessarily rooted in computer technology, in internet-centric environments, and/or in networking technology to overcome an actual technical problem arising in network communication, and/or real-time insertion of web browser media object(s) in web page being rendered by a browser running on a client terminal.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As used herein, the term code may mean (depending on the context) compiled code, human readable program code, hypertext, a script, and/or other instruction implementations.

The web browser media object(s) may be implemented as an online advertisement that performs actions on the client terminal of a user viewing the ad as part of a web page, for instance, a programmatic ad.

Exemplary actions performed by the web browser media object(s) include, animation, sound, video, pop-up windows, and background data collection. The web browser media object(s) may be accessed remotely using a link, from the web browser of the client terminal accessing the web browser media object(s) located on a remote advertisement server.

As used herein, the term component (i.e., web browser media object(s) component) and resource (i.e., web browser media object(s) resource) may sometimes be interchanged, and/or have a common meaning.

As used herein, the term web browser may be interchanged with the term mobile application, the term web page may be interchanged with the term application, and the term web server may be interchanged with the term application server. For example as described herein, the user may use the web browser to access a web page hosted by a web server, or use a mobile application installed on a mobile device to access data on an application hosted by the application server. For clarity, web pages hosted by web servers are described, but it should be understood that the systems and/or methods described herein may be applied to applications hosted by servers accessed by users using mobile applications (e.g., installed on a mobile device).

As used herein, the terms hierarchical, iterative, and recursive may sometimes be interchanged where referring to the relationships between components and/or resources of the monitored web browser media object(s), for example, represented within the graph described herein (or other data structure implementation).

As used herein, the terms blocking and filtering are sometimes interchangeable.

As used herein, the terms monitoring (or monitored) and instrumentation (or instrumented) are sometimes interchangeable.

Figure 2:
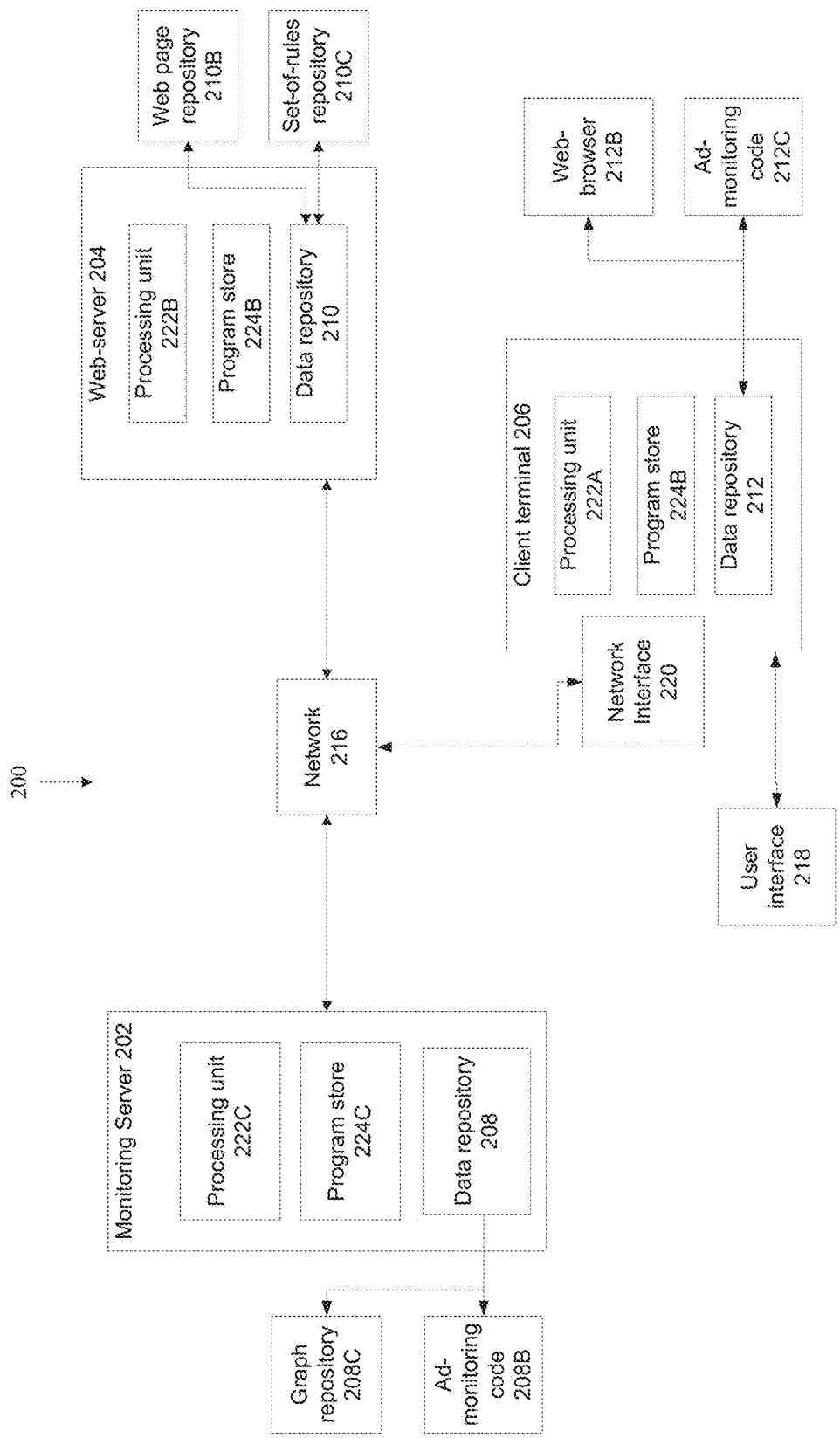
FIG. 2 is a block diagram of components of a system that executes monitoring-code located within a web page to monitor behavior of web browser media object(s) within the web page according to a set-of-rules, in accordance with some embodiments of the present invention.

Reference is now made to FIG. 1, which is a flowchart of a method of monitoring activities and/or events driven by web browser media object(s) received in response to a web browser request at a web browser rendering a web page, in accordance with some embodiments of the present invention. Reference is also made to FIG. 2, which is a block diagram of components of a system 200 that executes monitoring-code loaded with web browser media objects received in response to a web browser request at a web browser rendering a web page, in accordance with some embodiments of the present invention. The monitoring-code identifies a deviation from a set-of-rules according to an analysis of the monitored activities and/or events driven by the web browser media object(s). System 200 may execute the acts of the method described with reference to FIG. 1, for example, by a processor executing code instructions stored in a storage device. System 200 and/or the method of FIG. 1 monitor activities and/or events driven by the web browser media object(s) in real time according to the set-of-rules, to identify web browser media object(s) and/or web browser media object(s) components that deviate from the set-of-rules. New activities and/or events of web browser media object(s) and/or new web browser media objects, for example, dynamically inserted in real-time into the web page by an ad-server, may be monitored in real-time for deviation from the set-of-rules. The deviating web browser media object(s) and/or component may be blocked (e.g., in real-time), filtered, and/or reported (e.g., to a server).

System 200 includes a monitoring server 202 that provides ad-monitoring code 208B (stored in a date repository 208) that is inserted into a web page (e.g., stored in a web page repository 210B of data repository 210 of a hosting web server 204). Ad-monitoring code 208B may be directly inserted into the web page (e.g., as one or more code instances each associated with a designated location for insertion of web browser media object(s)), and/or accessed remotely using a link and/or software interface for example, as described with reference to block 102. Server 202 may store a graph (or other data representation) for each web browser media object(s) that represents links and/or a hierarchical relationship between components of the web browser media object(s) and/or web browser media object(s) resources. Graphs may be stored in graph-repository 208C stored in data repository 208 of monitoring server 202.

System 200 includes one or more client terminals 206 that communicate with web server 204 over network 216. A web browser 212B (e.g., stored in data repository 212 of client terminal 206) may access the web page hosted by web server 204, and render the web page for presentation on user interface 218 of client terminal 206. Ad-monitoring code inserted within web page may be executed by web browser 212B and optionally locally stored as ad-monitoring code 212C in data repository 212 of client terminal 206. Ad-monitoring code may be loaded with web browser media object(s) dynamically inserted into the web page by ad-server 214 to monitoring the activities and/or events driven by the web browser media object(s) using a set-of-rules. The set-of-rules may be stored, for example, in set-of-rules repository 210C of data repository 210 of web server 204, locally stored in data repository 212 of client terminal 206, and/or inserted within the web page.

Client terminal 206 may include a network interface 220 for connecting to network 216, for example, one or more of, a network interface card, a wireless interface to connect to a wireless network, a physical interface for connecting to a cable for network connectivity, a virtual interface implemented in software, network communication software providing higher layers of network connectivity, and/or other implementations.

Monitoring server 202 may communicate with client terminal 206 over network, for example, receiving transmissions of the activities and/or events driven by the web browser media object(s) components and/or links between ad-components for analysis, and/or creation and/or updating of the graph stored in ad-graph repository 208C.

Client terminals 206 may be implemented as, for example, a mobile device, a desktop computer, a thin client, a Smartphone, a Tablet computer, a laptop computer, a server, a wearable computer, glasses computer, and a watch computer. Exemplary user interfaces 218 include, for example one or more of, a touchscreen, a display, a keyboard, a mouse, and voice activated software using speakers and microphone.

Exemplary network 216 includes the internet, a private network, a local area network, and/or a cellular network, and a wireless network.

Each of client terminal 206, and web server 204, and monitoring server 202 include a respective processing unit 222A-C, a program store 224A-C storing code instructions for execution by the respective processing unit, and optionally a data repository 212, 210, and 208 that stores data.

Processing units 222A-C may be implemented, for example, as a central processing unit(s) (CPU), a graphics processing unit(s) (GPU), field programmable gate array(s) (FPGA), digital signal processor(s) (DSP), and application specific integrated circuit(s) (ASIC). Processing unit(s) 222A-C may include one or more processors (homogenous or heterogeneous), which may be arranged for parallel processing, as clusters and/or as one or more multi core processing units.

Program stores 224A-C store code instructions implementable by respective processing units 222A-C, for example, a random access memory (RAM), read-only memory (ROM), and/or a storage device, for example, non-volatile memory, magnetic media, semiconductor memory devices, hard drive, removable storage, and optical media (e.g., DVD, CD-ROM).

Data repositories 212, 210, and 208 may be implemented as, for example, a memory, a local hard-drive, a removable storage unit, an optical disk, a storage device, and/or as a remote server and/or computing cloud (e.g., accessed using a network connection).

At 102, ad-monitoring code is installed in association with web pages. The ad-monitoring code may be included in the code of each web page, for example, as a link, as a script, as hypertext, as compiled code, and/or as human readable program code. The ad-monitoring code may be manually entered by a programmer, and/or automatically inserted by code (e.g., in proximity to designated web browser media object(s) spots). The ad-monitoring code may be inserted, for example, as a link to a remote server storing the ad-monitoring code (e.g., monitoring server 202), as an interface to ad-monitoring code which may be stored on monitoring server 202, on web server 204, and/or locally by client terminal 206 (e.g., application programming interface (API), software development kit (SDK), a function library, or other software interfaces), and/or as the actual code performing the monitoring.

Optionally, multiple instances of ad-monitoring code are inserted into the web page, optionally each instance is inserted in association with a designated location (e.g., space within the web page, such as within a frame) for a web browser media object(s). Each ad-monitoring code instance may be designed to monitor the associated web browser media object(s). Alternatively or additionally, a single instance of ad-monitoring code is inserted into the web page for monitoring all web browser media object(s) instances.

Optionally, each ad-monitoring code instance monitors the activities and/or events driven by the respective web browser media object(s) without monitoring other content of the web page and/or other web browser media objects being monitored by other ad-monitoring code instances. Each ad-monitoring code may monitor a single web browser media object(s), or a group of web browser media object(s) associated with the same designated location.

The ad-monitoring code may be located in proximity to the web browser media objects and/or to the designated location for receiving the web browser media object. As used herein, the term proximity may mean physical proximity, for example, the ad-monitoring code may be located a certain number of characters and/or certain number of lines away from the web browser media object(s) in the code of the web page. Alternatively or additionally, the term proximity may mean logical proximity and/or logically linked, where the ad-monitoring code and the web browser media object(s) are loaded and executed (e.g., by the browser and/or executed by the processor) together, in parallel and/or sequentially, and/or close in time to one another, for example, the ad-monitoring code and the web browser media object(s) are located within a common frame that is loaded and executed.

Ad-monitoring code 208B may be stored in data repository 208 of monitoring server 202, for remote access (e.g., using a link and/or an interface), and/or for download-to web server 204 and/or client terminal 206. As described herein, the functions performed by the ad-monitoring code may be performed entirely by one device, or performed by multiple devices (e.g., based on transmission of data between devices). For example, local monitoring may be performed by client terminal 206, analysis of the monitored data may be performed by monitoring server 202, and verification and/or block may be performed by web server 204.

Optionally, a set-of-rules is defined manually by a user, automatically created by code (e.g., based on an analysis of performance of web server 204 and/or client terminal 206), and/or based on predefined configurations. Set-of-rules may be stored as code, as a script, as a text file, as database entries, as values for predefined parameters, and/or other implementations. The defined set-of-rules may be stored in a set-of-rules repository 210C stored in data repository 210 of web server 204. Alternatively or additionally, the set-of-rules may be created and/or stored by client terminal 205, and/or monitoring server 202. Alternatively or additionally, the set-of-rules may be included within the code of the web page, for example, as code inserted into the web page code, and/or as a link to an external server hosting the set-of-rules.

The set-of-rules define undesired parameters representing an allowable and/or prohibited degradation to the user experience of a user using web browser 212B (stored by data repository 212 of client terminal 206) to access the web page hosted by web server 204. The set-of-rules is based on the degradation due to the web browser media object(s) which is inserted into the web page when accessed by the user using web browser 212B. The web browser media object(s) may drive activities and/or events that degrade the user experience of the visitor to the web site and/or degrade the performance of the mobile application used by the user, for example activities and/or events that, hog network resources (e.g., wireless bandwidth), elevate central processing unit (CPU) utilization, slow down loading of the web page, slow down performance of client terminal 206, slow down execution of other applications running on client terminal 206, generate sound (e.g., loud, uncontrollable sound), and/or introduce malware to client terminal 206.

The web browser media object(s) may be transmitted by ad-server 214 (or another server) in response to a browser request at a browser rendering the web page. The web browser media object(s) may be loaded dynamically in real time when web browser 212B is rendering the web page stored on web server 204. Web browser media object(s) may be a programmatic ad-selected in real-time. The actual provided web browser media object(s) may not be known until the web browser media object(s) is already loaded with the accessed web page by web browser 212.

Optionally, the set-of-rules define allocation of resources and/or allowed and/or prohibited activities and/or events driven by the web browser media object(s). The set-of-rules may define allocation of resources and/or allowed and/or prohibited activities and/or events for each web browser media object(s), for a group of web browser media objects, and/or globally for all the web browser media objects simultaneously executing on the loaded web page.

Exemplary set-of-rules include one or more of: network usage by the web browser media object(s) causing a statistically significant reduction in network performance, processing resource utilization by the web browser media object(s) causing a statistically significant reduction in performance of the client terminal, statistically significant user noticeable slow-down in loading of the web page, statistically significant user noticeable slowdown in execution of other applications running on the client terminal, and detection of malware. The statistically significant level may be defined by the user and/or by the host of the web page, for example, as user noticeable and/or user tolerable reduction in performance. Some reduction in performance may be allowable. The set-of-rules define how much reduction of performance is tolerated.

The set-of-rules may define the size of the designated web browser media object(s), for example, what percentage of the screen the web browser media object(s) is allowed to use, and/or the location of the web browser media object(s). Optionally, the web browser media objects are designated for execution within a frame (e.g., a hypertext markup language (HTML) iframe) having a size and/or shape defined by the set-of-rules Optionally, the set-of-rules is designed to detect undesired activity, for example, web browser media object(s) associated with an advertiser bot. Alternatively or additionally, the set-of-rules is designed to control activities and/or events driven by web browser media object(s) which may not necessarily be predicted (e.g., by traffic simulator and/or manual auditing) since the true activities and/or events driven by the web browser media object(s) may not be known until the web browser media object(s) is actually loaded. For example, the set-of rules may be designed to control activities and/or events driven by web browser media object(s) selected based on a frequency capping method and/or re-targeting method.

At 104, data for rendering of a web page by web browser 212 is transmitted from web server 204 to client terminal 206 over network 216. The web page includes designation(s) for placement of web browser media object(s), and ad-monitoring code instruction instances. Optionally each ad-monitoring code instance is located in proximity to respective designations for placement of respective web browser media objects.

At 106, the web page is locally rendered and presented by web browser 212B on a display (e.g., user interface 218) of client terminal 206.

Each ad-monitoring code instance and associated web browser media object(s) may be loaded together (e.g., simultaneously, in parallel, and/or sequentially), optionally by browser 212B. The loading of the ad-monitoring code and web browser media object(s) may be performed per respective frame of the web page. The executing ad-monitoring code instance monitors activity and/or events driven by the associated web browser media object(s) within the respective frame. The loaded ad-monitoring code 212C may be locally stored in data repository 212 of client terminal 206.

Optionally, ad-server 214 provides the web browser media object(s) for each designated location of the web page dynamically during the loading. The web browser media object(s) are received in response to a browser request at a browser rendering the web-page. The provided web browser media object(s) may include one or more links to resources (e.g., additional web browser media object(s) instructions), which may be located on ad-server 214 and/or on another remote server, for example, a server of the business entity associated with the web browser media object(s) and/or a server of a data collection and/or advertising agency associated with the web browser media object(s). The additional linked resources may include instructions for execution by browser 212B of client terminal 206, which may degrade the user experience and/or degrade performance of client terminal 206, as described herein. The web browser media object(s) resources may be arranged in a hierarchy, where one web browser media object(s) resources includes instructions to execute one or more other web browser media object(s) resources, for example, by linking to other web browser media object(s) resources located on the same or another remote server. The hierarchical web browser media object(s) resources may trigger a chain of activity, which may be exponential in nature, which may severely degrade performance of client terminal 206.

At 108, each ad-monitoring code instance monitors the activities and/or events driven by the respective web browser media object(s), which may be located in proximity to the respective ad-monitoring code instance.

Optionally, the monitoring is performed to identify the activities and/or events driven by each component of the web browser media object(s) (e.g., when the web browser media object(s) is organized as hierarchical and/or includes links to other remotely located web browser media object(s) resources). The certain component of the web browser media object(s) that caused the deviation from the set-of-rules may be identified. The certain problematic component may be blocked, rather than the entire web browser media object(s), which may allow the ad-to be presented to the user without necessarily degrading the user experience and/or performance of client terminal 206.

The ad-monitoring code may monitor one or more parameters before and/or after loading of the web browser media object(s). The ad-monitoring code may monitor one or more parameters of client terminal 206 based on the set-of-rules associated with the respective web page and/or the set-ofrules associated with the respective web browser media object(s). For example, the ad-monitoring code may monitor CPU usage of client terminal 206, network bandwidth available to client terminal 206 (e.g., wireless and/or wired), available memory on client terminal 206, delay between detected user actions (e.g., mouse click) and response (e.g., changes on the display), activation of sound, and detection of malware (e.g., which may be performed by a third party malware detection application that communicates with the ad-monitoring code).

As used herein, the term mutation event is not necessarily intended to be limited to a certain implementation. For example, the term mutation event may be interchanged with the term Mutation Observer, and/or may mean other mutation listener implementations and/or any other mechanism to detect DOM and/or web page and/or user interface changes.

The ad-monitoring code may monitor the document object model (DOM) of the web page to detect changes to the DOM. Ad-monitoring code may monitor the DOM to detect mutation events, for example, by adding an event handler that detect the mutation event to the DOM of the web page. When ad-monitoring code detects the mutation event indicating a change to the DOM, the ad-monitoring code may determine which web browser media object(s) caused the mutation event, optionally by analyzing a stack trace of client terminal 206. The code identified by the stack trace as being associated with the mutation event may be traced to the web browser media object(s) that caused the mutation. The certain component (e.g., web browser media object(s) resource) that caused the mutation event may be identified based on the stack trace.

The ad-monitoring code may monitor network activity over network 216 (e.g., transmitted via network interface 220) which may be associated with the web browser media object(s), for example, to detect an increase in network activity, and/or detect packets associated with the web browser media object(s) (e.g., origin and/or destination addresses). Monitoring of network activity may be performed by issuing queries to a third party network monitoring application and/or device to report current network activity. Monitoring of network activity may be performed by timing recently opened interfaces (e.g., APIs) that were opened by web browser 212B.

The ad-monitoring code may monitor for undesired sound and/or video generated by the web browser media object(s), for example, by binding to change events indicative of audio and/or video elements of the web page.

The ad-monitoring code may perform recursive monitoring during loading of sub-frame(s) within a loaded parent frame of the web page. The recursive monitoring is performed by monitoring the activities and/or events driven by the web browser media object(s) within the loaded sub-frame and/or parent frame, optionally by monitoring the activities and/or events driven by the component of the web browser media object(s) that is executing within the sub-frame(s). The ad-monitoring code may recursively bind itself to the current parent frame, and/or the detected sub-frame. The web browser media object(s) may perform recursive monitoring, for example, by identifying changes to the DOM (e.g., mutation events), network activity, and/or other monitoring methods described herein.

Optionally, the ad-monitoring code monitors activities and/or events driven by the web browser media object(s) based on one or more technological platform implementation of the web browser media object(s). The ad-monitoring code may monitor different aspects of the technological implementation, for example, the activities and/or events achieved using programming language(s) used to create the web browser media object(s) (e.g., player based languages, vector, animation, hypertext), DOM representation of the web browser media object(s), software interface used by the web browser media object(s) (e.g., API, SDK), and network activity due to the web browser media object(s).

Optionally, the monitoring is performed by creating a call chain of components of each web browser media object(s). The call chain may be created by analyzing call stacks to identify the connectivity between the components of the web browser media object(s). Optionally, the monitoring is performed using instrumentation code. For example, when using JAVASCRIPT™, the XMLHttpRequest object and/or the browser Fetch API object and/or associated objects may be overridden to analyze the call stack within the JAVASCRIPT™ and/or AJAX network request call to obtain the element that originated the request. Optionally, the business entity associated with each web browser media object(s) resource may be identified, for example, by mapping the web browser media object(s) resource to the business entity by following the link to the web browser media object(s) to identify the server hosting the web browser media object(s).

In another example of instrumentation code, the call chain may be constructed from the stack, for example, by defining a function (e.g., getCallingScript( )) that when invoked obtains the current stack trace. An exemplary implementation of such a function throws and immediately catches an error. An ordinal list of web browser media object(s) components (e.g., script) sources may be extracted from the stack trace. The first web browser media object(s) component is the code (e.g., script) that invoked the function (e.g., getCallingScript( )) and is discarded. The remaining code represents the calling chain.

The instrumentation constructor function implementation (e.g., of AJAX) may be used to control the rate of network requests.

Optionally, the ad-monitoring tracks loading of each web browser media object(s) resource. The loading data is used to build a dependency graph representing dependency between web browsers media object(s) resources of each web browser media object(s). Each node of the graph may represent a web browser media object(s) resource. Edges between nodes represent dependencies. The dependencies may be obtained from the identified call chain. Additional data may be collected in association with each tracked loading event. The additional data may include time of loading relative to the start of the loading process of the web page, and/or the location of the web browser media object(s) resource in the web page relative to the root of the web page. The additional data may be represented within the created dependency graph as weights (e.g., absolute or relative) assigned between nodes of the graph. The weights may represent the loading time and/or distance based on the location, and/or other data. The location and/or distance may be defined according to the distance between nodes, for example, in a graph (e.g., directed acyclic) representation of the DOM the distance may be the number of edges in a shortest path. The location and/or distance may be defined as the distance on the display between two points (e.g., which may be calculated as a line between the two points according to geometrical coordinates on the screen, which may represent the actual physical distance in terms of centimeters, pixels, or other measurements). A single weight may be used (e.g., function based on time and distance), and/or weights may be used for each type of data (e.g., one weight for time, and another weight for distance).

Optionally, the loading relationships of ad-resources of the web page, and optionally the time of loading and/or the location of the ad-resource may be collected by ad-monitoring code 212C during the session (i.e., while the web page is presented by web browser 212). Upon terminal of the session (e.g., closing of the web page and/or closing of web browser 212) and/or at one or more points throughout the session, the collected data may be added to a common graph created for the web browser media object(s) and/or representing an average of weights based on multiple sessions (i.e., multiple events of users viewing the web browser media object(s) on the same or different web pages). The collected data may be transmitted from client terminal 206 to monitoring server 202, which may store common graphs for each web browser media object in a graph repository 208C (e.g. stored in data repository 208). Graph repository 208C may be implemented, for example, as a database storing a representation of each graph. The common graph for the web browser media object(s) may be updated with new nodes and/or new edges between nodes based on the monitored data (e.g., different sessions may activate different web browser media object(s) components). The weights may be updated based on the new measurements obtained during each session. The common graph represents an average weighted graph of web browser media object(s) resources for each web browser media object(s).

Optionally, a machine learning method is applied to the common graph to identify web browser media object(s) resources deviating from the set-of-rules. Optionally, a cluster analysis method is applied to the graph to identify clusters representing dependent web browser media object(s) resources. The machine learning method may be stored as code in data repository 208 of monitoring server 202.

One or more of the monitoring functions may be performed remotely by monitoring server 202 and/or web server 204 based on data transmitted over network 216 by client terminal 206. For example, ad-monitoring code 212C stored in data repository 212 of client terminal 206 may collect monitoring data, and transmit the collected monitoring data to monitoring server 202 for aggregation and/or monitoring analysis.

Optionally, each instance of ad-monitoring code monitors respective web browser media object(s) using the same or similar set-of-rules, for example, each instance of ad-monitoring code monitors whether inappropriate sound is generated by the web browser media object(s). Alternatively or additionally, each instance of ad-monitoring code is customized to monitor web browser media object(s) using a different set-of-rules, for example, each web browser media object(s) is monitored for the size it takes up on the web page according to the designated location and size allocated for the respective web browser media object(s).

Reference is now made to FIG. 4, which is an example of ad-monitoring code (written in FLASH™) that detects recursive loading of FLASH™ components of the web browser media object(s), in accordance with some embodiments of the present invention. Other technological platforms may be monitored independently, and/or in association with the FLASH™ components.

Reference is now made to FIG. 5, which is an example of pseudo-code for creating an instrumentation constructor function implementation that monitors the stack trace, in accordance with some embodiments of the present invention.

Referring now back to FIG. 1, at 110, a deviation from the set-of-rules is identified according to an analysis of the monitored activities and/or events of each web browser media object(s). The deviation may identified per web browser media object using the set-of-rules that define allowable behavior of the respective web browser media object, for example, each web browser media object is analyzed to determine whether sound is generated by the respective web browser media object. The deviation may be a global deviation based on a set-of-rules that define global behavior of multiple (e.g., all) web browser media objects of the web-page. For example, the network activity created by individual web browser media object may adhere to the set-of-rules, however the combined network activity generated by all the web browser media objects loaded with the web-page may deviate from the set-of-rules.

The deviation from the set-of-rules may be a prediction, when the activities and/or events of the web browser media object(s) have not yet occurred. For example, the analysis is performed to predict the outcome when the activities and/or events are allowed to occur, without actually executing the activities and/or events. For example, the prediction may be performed by executing the activities and/or events on a virtual DOM, rather than on the actual DOM used in operation. Alternatively, the deviation is determined based on the executed activities and/or events, for example, when the activities and/or events have already occurred, and/or dynamically as the activities and/or events are occurring.

Each web browser media object(s) may be independently analyzed for identification of the deviation based on the monitoring performed by the associated ad-monitoring code instance. Each component of each web browser media object(s) may be independent analyzed for identification of deviation based on the monitoring performed by the associated ad-monitoring code instance. For example, when a certain web browser media object(s) is determined to have deviated from the set-of-rules, an analysis may be performed to determine which component(s) caused the deviation.

Optionally, the size of the respective frame used by the web browser media object(s) is verified to be according to the designated ad-size defined by the set-of-rules. Other activities and/or events aspects defined by the set-of-rules may be independently verified, for example, CPU usage, performance degradation, network activity, and malware introduction.

The analysis and/or identification of the deviation may be performed locally by client terminal 206 (e.g., using the locally installed ad-monitoring code 212C and/or other code such as analysis code), and/or remotely by monitoring server 202 and/or web server 204 based on data transmitted over network 216 by client terminal 206. For example, ad-monitoring code 212C stored in data repository 212 of client terminal 206 may collect monitoring data, and transmit the collected monitoring data to monitoring server 202 for analysis.

At 112, when a certain web browser media object(s) is identified as having deviated from the set-of-rules, the certain web browser media object(s) may be blocked and/or filtered. Filtering may be performed at the web browser media object(s) level (i.e., blocking the entire web browser media object(s)), at the component web browser media object(s) level, and/or blocking access to the remotely located web browser media object(s) resources. Alternatively or additionally, the certain web browser media object(s) are provided with a predefined virtual response (e.g., message) representing false data that is different than a response with real data. The virtual response allows the web browser media object(s) to continue operating, without deviating from the set-of-rules, optionally while thinking that the action (which would have deviated from the set-ofrules) has occurred. For example, a web browser media object that plays a video with sound and then queries the sound to make sure the sound is playing may be provided with a response that sound is playing, when in fact sound is off (to avoid violating the set-of-rules that prohibit sound).

The blocking may be performed locally at client terminal 206, and/or by web server 204 (which may block the present web browser media object(s) on the client terminal that detected the deviation and from other client terminals and future instances of the web browser media object(s) from appearing at other the client terminal). The web browser media object(s) that deviated from the set-of-rules may be added to a black list for future blocking. The blocking may be performed by automatically removing the designation within the web page associated with the web browser media object(s) identified as deviating from the set-of-rules.

The blocking may be performed in real-time, upon detection of deviation from the set-of-rules. The real-time blocking may recover the degradation. The real-time blocking may be performed quickly enough, before the user is able to detect the performance degradation.

When the problematic component is identified, the component may be blocked and/or removed, for example, from the DOM, from the HTML, from the FLASH™ code, from the SDK accessing the native component.

Blocking may be performed at the network level, for example, at a router or other network computing device.

Alternatively, web browser media object(s) determined to have not deviated from the set-of-rules (e.g., upon termination of the web page) may be added to a white list.

At 114, a report may be automatically generated (e.g., by code stored in data repository 208 of monitoring server 202). The report may include a statistical analysis of the monitoring of each web browser media object(s) and/or each web browser media object(s) component and/or resource, an analysis of the analysis results, a report of the identified deviation from the set-of-rules, and/or a report of the blocking. The report may include the calling chain that lead-up to the problematic component that deviated from the set-of-rules.

The report may be provided to ad-server 214 to help determine the problematic web browser media object(s) and/or component. The report may be used to isolate the cause of the problematic occurrence, and/or provide meaningful business intelligence of the advertiser or advertising agency that created the problematic web browser media object(s).

Optionally, the monitoring related data that is transmitted over network 216 as part of the process described with reference to FIG. 1 (e.g., transmitted between client terminal 206, monitoring server 202, and/or web server 204) is reduced, using one or more of the following exemplary methods:

A web beacon (e.g., sendBeacon API used by web browser 212B) may be used to send a final payload-of monitoring data (e.g., to monitoring server 202) when the user is about to end the session where ad-monitoring code is running (e.g., the DOM unload-event). Since we browsers may limit the size of the payload-sent by the web beacon, the ad-monitoring code (or other code) transmitting the monitoring data tracks and predicts the size of the next payload. A beacon is transmitted with monitoring data when sending using sendBeacon may fail due to size of the payload. The number of transmitted web beacons may be selected to reduce the overall required amount.

Using web sockets to compress data transmitted from client terminal 206 to monitoring server 202.

Filtering the collected monitored data and/or customizing the collection of the monitoring data. For example, the sampling rate of the monitored data may be varied depending on the estimated significance of the monitoring data, for example, critical network related data may be sampled at a higher rate relative to network data with low priority.

Figure 3:
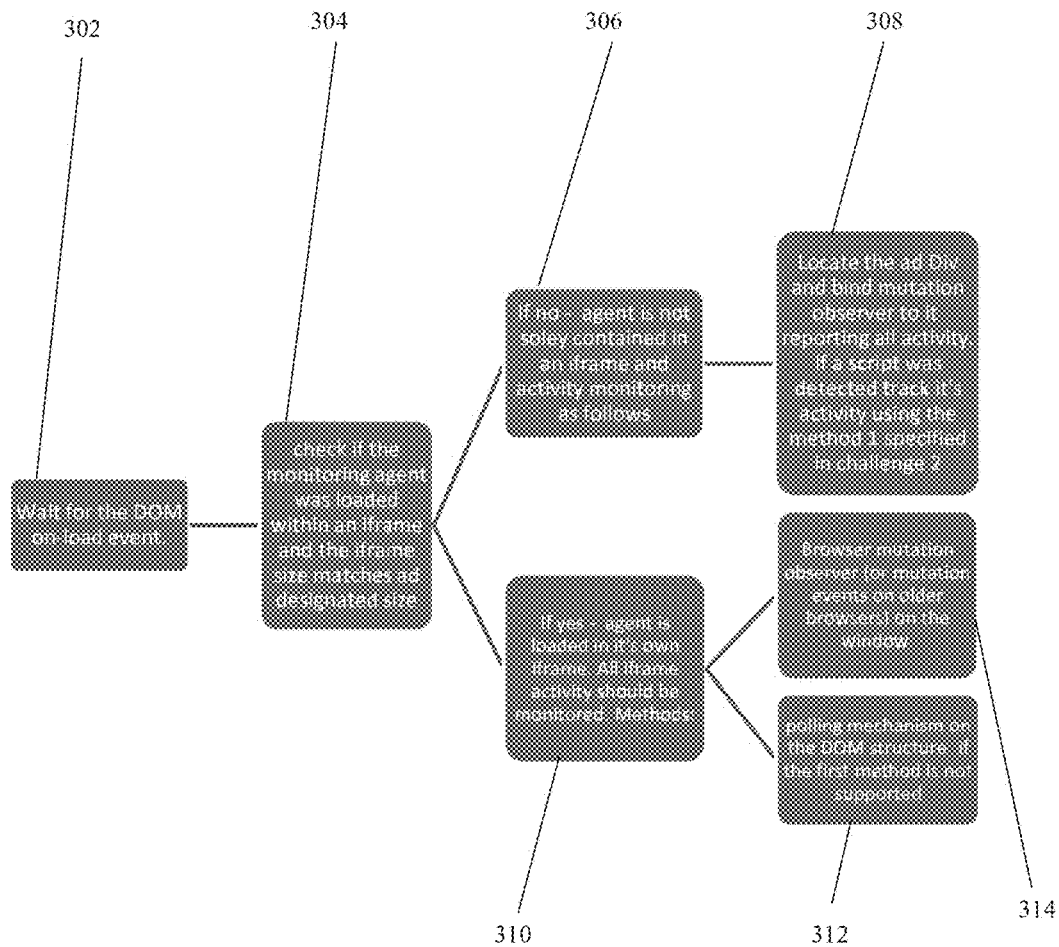
FIG. 3 is a flow chart of an exemplary method implementing the monitoring of the behavior of web browser media object(s) inserted in a web page, in accordance with some embodiments of the present invention.

Reference is now made to FIG. 3, which is a flow chart of an exemplary method implementing the monitoring of the activities and/or events driven by web browser media object(s) inserted in a web page, in accordance with some embodiments of the present invention. The method described with reference to FIG. 3 is an exemplary implementation based on the method of FIG. 1, and may be executed by system 200 described with reference to FIG. 2.

At 302, the DOM on-load event of the web page is detected, for example, by web browser 212B, and/or by other code instruction stored in data repository 212.

At 304, the ad-monitoring code is loaded, optionally by web browser 212B. An analysis is conducted to determine whether the ad-monitoring code is loaded within a location designated for insertion of web browser media object(s), for example, a window, an iframe, or other implementation. When the web browser media object(s) is inserted into the designated location, the ad-monitoring code verifies that the web browser media object(s) adheres to the set-of-rules defined for the iframe, for example, the size of the web browser media object(s) is according to the set-of-rules defining the allowed web browser media object(s) size for the iframe.

Instances of ad-monitoring code may be loaded for each iframe designated to include web browser media object(s).

At 306, the analysis determines that the ad-monitoring code instance is not contained within the iframe.

At 308, the ad-monitoring code monitors the web browser media object(s) by locate the web browser media object(s) within the web page (e.g., identifying the HTML div element used to define the web browser media object(s) and/or the location designated to receive web browser media object(s)). An event mutation observer code (which monitors for changes in the DOM) is bound to the div element. Activity of components of the web browser media object(s) may be tracked by analyzing the stack trace, as described herein.

Alternatively, at 310, the analysis determines that the ad-monitoring code is loaded in a designated location (optionally iframe or another window representation) for insertion of web browser media object(s) by the ad-server. The ad-monitoring code monitors activity within the iframe.

At 312, the ad-monitoring code monitors for mutations occurring within the iframe, for example, using a browser mutation observer feature to monitor for changes occurring with a window. The monitoring is based on the assumption that activity occurring within the iframe is related to the web browser media object(s) inserted within the iframe.

Alternatively or additionally, at 314, the ad-monitoring code monitors the iframe by a polling mechanism on the DOM structure.

Figure 6:
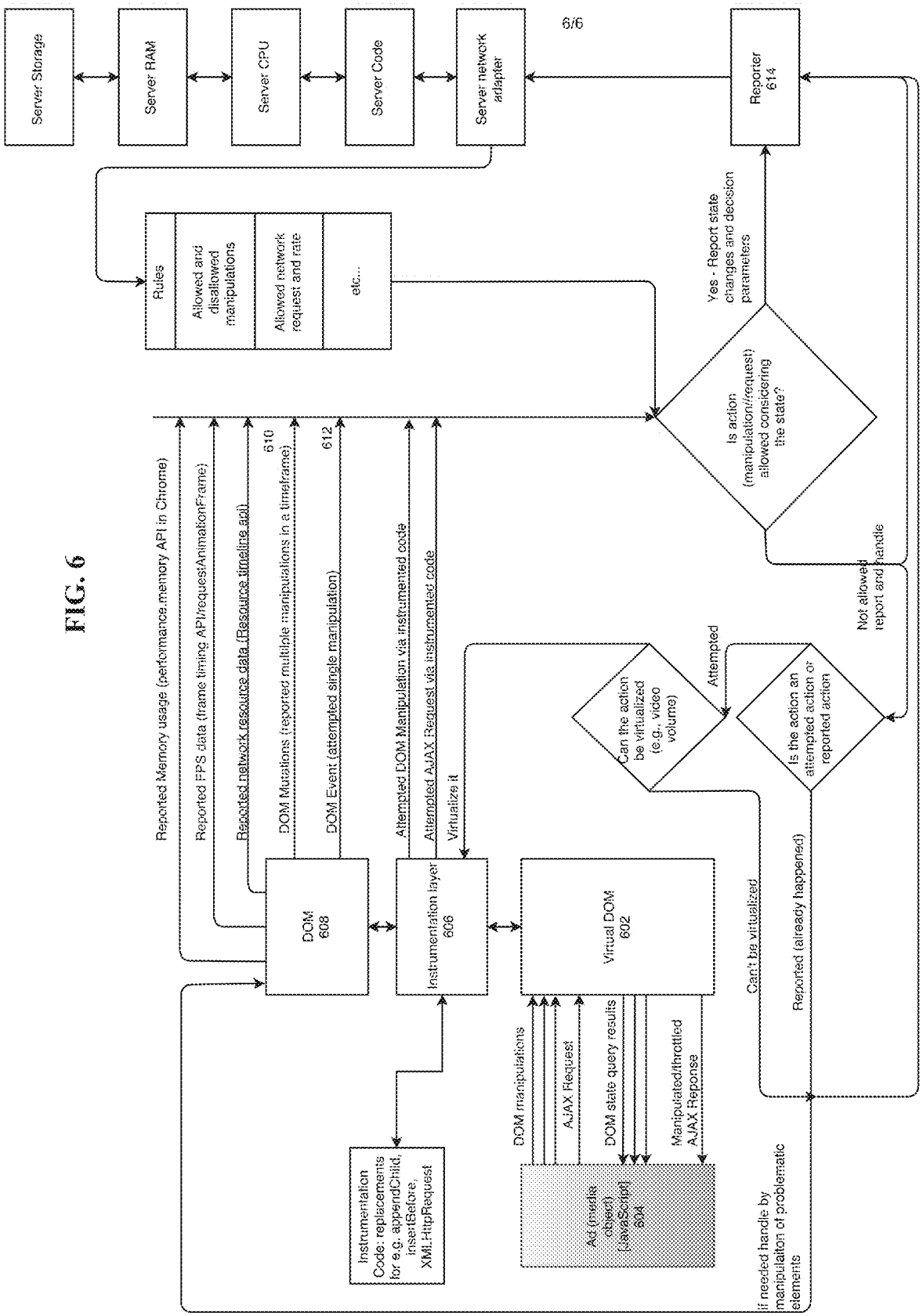
FIG. 6 is an exemplary dataflow implementation based on the method described with reference to FIG. 1, and/or executed using the system described with reference to FIG. 2, in accordance with some embodiments of the present invention.

Reference is now made to FIG. 6, which is an exemplary dataflow implementation based on the method described with reference to FIG. 1, and/or executed using system 200 described with reference to FIG. 2, in accordance with some embodiments of the present invention. The dataflow diagram depicts a virtual DOM 602 (e.g., stored as code instructions executable by processor(s)) that communicates with a web browser media object 604 (as described herein), optionally as a proxy and/or a filter to the actual DOM 608 (i.e., used to control the web document). Virtual DOM 602 may communicate with an instrumentation layer 606 (e.g., corresponding to the ad-monitoring code described herein), which performs the monitoring, analysis, and/or implements decisions. Instrumentation layer 606 may decide to allow messages (e.g., instructions, queries) to continue to actual DOM 608, block the messages, and/or instruct virtual DOM 602 to provided simulates responses back to web browser media object 604.

Web browser media object 604 may be proxied and/or instrumented, optionally by the ad-monitoring code. The executed code based on web browser media object 604 may be modified by replacement, for example, replacing built in symbols (e.g., functions and/or object members in the ad browsing context) with functions that may act as a proxy and/or intercept actions (e.g., read, write, query) on the symbol with customized code. Such instrumentation of the web browser media object 604 may be obtained by injecting functions (e.g., code elements) and/or properties that replace the functions and/or properties of the web browser media object 604. For example, the same symbol and/or function name and/or method name may be used such that the corresponding instrumented code is executed rather than the code of the web browser media object 604. The function and/or property may be, for example, a member of a class and/or prototype object, that when replaced causes all instances of the class and/or prototype object to use the instrumented member instead.

Actions (e.g., instructions, messages, queries, read operations, write operations) executed by web browser media object 604 on DOM 608 are intercepted by virtual DOM 602 and/or instrumentation layer 606. For example, manipulations and/or queries about the state of DOM 608, for example, loading external resources vial relevant HTML elements (e.g., <image>, <script>, <object>) and AJAX network requests.

Instrumentation layer 606 (e.g., corresponding to the ad-monitoring code described herein) may pass the action along to DOM 608, block the actions, or respond using virtual DOM 602 to the actions using custom responses (i.e., rather than letting DOM 608 respond with the true answer). Instrumentation layer 606 operates according to the set-of-rules, to help make sure that the actions performed by web browser media object 604 are according to the actions allows by the set-of-rules, and/or by prohibiting actions not allowed according to the set-of-rules.

In some cases, actions are not detected by instrumentation layer 606. In such cases, a DOM MutationObserver process 610 (e.g., code executable by a processor(s)) may be invoked, for example, by the API of the browser, for example, at predefined time intervals, to handle batched manipulation reports.

Actions issued by the web browser media object 604 may be termed an attempted action when such an action may be intercepted and blocked, filtered, or responded to with false information. Actions that have already occurred (e.g., detected post occurrence) or were unsuccessfully stopped may be termed a reported action (i.e., due to reporting after the fact).

The behavior of actions is detected, reported, and/or identified (e.g., attempts at state changes of DOM 608), and compared against the set-of-rules that defined allowed and/or prohibited actions (e.g., changes and/or states). When an attempted action is detected as being in violation of the set-of-rules, the attempted action is blocked (e.g., prevented from execution by not allowing the action to pass to DOM 608), and/or virtual DOM 602 may provided a reply (i.e., instead of DOM 608) that conforms to the set-of-rules. For example, an ad may play a video with sound, and then issues a query to check that the sound is playing. When the set-of-rules prohibit sound, the sound command might be blocked, and the ad might be provided with a response to the query by the virtual DOM 602 that the sound is playing (when in fact the sound is blocked) to allow the ad to continue running otherwise.

When a reported action is detected (i.e., the action already occurred), code (e.g., ad-monitoring code, or other code) may remove the code elements that caused the problematic behavior, and/or remove the web browser media object 604 itself.

To determine the behavior of an action(s) issued by the web browser media object 604, additional information about the state of the computing environment executing the web browser media object 604 may be collected. The collected information may be analyzed to better gauge user experience and the allowed behavior of web browser media objects 604 as a function of the collected data. Exemplary collected data includes, for example, the current frame rate, information about memory usage, information about network resources being loaded by the web browser media object 604 (e.g., resource URL, load start time, and time to fully load the resource) may be used to determined, for example, the network load, network latency, and other network performance parameters.

The ad-monitoring code may use the instrumentation data to determine the relationship(s) between internal entities and/or components of the web browser media object 604, for example, the web browser media object 604 may load third party objects that further load other objects. The ad-monitoring code may track and/or analyze the load chain (e.g., using stack traces) to determine which object is responsible for which function call(s). Identifying the load chain may be used to block the behavior of the loading of the third party objects, for example, by preventing loading of the first object in the chain.

Details of the dataflow (e.g., state changes, attempted changes, actions, resulting counter actions) may be collected and reported, for example, using a reporter process 614 that transmits the report to a server.

Reference is now made to the following examples, which together with the above descriptions illustrate some exemplary implementations of the systems and/or methods (e.g., code executed by processor(s)) in a non limiting fashion.

Example 1 relates to an attempt by a web browser media object to load a disallowed third party script. The set-of-rules define that loading code (e.g., script) from a certain URL (uniform resource locator) is to be prevented, for example, code that check the src property of script elements using logic. The web browser media object calls the appendChild method (instrumented by the ad-monitoring code) to attempt to attach a script element to the DOM tree. The web browser media object attempts to load a script URL by modifying the src property (instrumented by the ad-monitoring code) of the script element. Code (e.g., ad-monitoring code, analysis code, or other code executed by a processor(s), as described herein) determines that the URL in src is not approved for loading according to the set-of-rules. Code determines that the action (i.e., loading of the script) is an attempted action that may be prevented by not passing the action to the real DOM. Since the action includes loading of code, the web browser media object may be in an undetermined state. Code may remove the entire web browser media object, or other third party media objects that are determined to be responsible for the attempted action. The previous state of the attempted state change may be reported, along with other decision parameters and/or metrics, which may be analyzed (e.g., manually by a human administrator and/or automatically by analysis code) to determine whether the code made the correct decision.

Example 2 relates to a web browser media object that attempts to play a video with a sound volume when sound is not allowed. The set-of-rules define that playing elements that emit a sound is not allowed (e.g., to be prevented). The web browser media object calls the appendChild method (instrumented by the ad-monitoring code) to attempt to attach a video element to the DOM tree. Code (e.g., ad-monitoring code, analysis code, or other code executed by a processor(s), as described herein) determines that the addition of the element is allowed, but instruments and/or monitors the volume state to enforce the set-of-rules. The web browser media object invokes a volume change. The code may identify the volume change attempt (i.e., the action) using the instrumented volume property of the element. When captured using the ad-monitoring code (e.g., instrumentation), code decides the action is a disallowed attempted action and issues instructions to prevent the action. Alternatively or additionally, the code determines that the action is to be virtualized by having the instrumented volume property return the expected property for a query of the property by the web browser media object, but not in fact change the property on the DOM. Alternatively or additionally, since the state expected by the web browser media object may be provided, the web browser media object is in a safe state, and no further removal of the web browser media object (or other related objects) is necessary. When the ad-monitoring code (e.g., instrumentation) is not applied or fails, the code may see the volume change is a reported action. The code may determine that the volume change is a disallowed reported action that a counter action is needed. Alternatively or additionally, the code may determine that the video element volume property is to be reset and/or a muted property activated. Alternatively or additionally, when the web browser media object includes instructions (e.g., code) to respond similarly to different volume changes, the code may decide repeated actions based on the assumption that the web browser media object has entered a problematic state and that the video element and/or web browser media object and/or other related object(s) are to be removed (e.g., deleted, blocked, ignored). The previous state of the attempted state change may be reported, along with other decision parameters and/or metrics, which may be analyzed (e.g., manually by a human administrator and/or automatically by analysis code) to determine whether the code made the correct decision.

Example 3 relates to a web browser media object that attempts to invoke networks requests beyond a predefined rate. The set-of-rules define a maximum rate for network requests, and optionally the type and/or format of requests (e.g., a set of parameters) that are subject to the maximum rate. The web browser media object creates an instance of an instrumented DOM XMLHttpRequest object to send a network (e.g., AJAX) request. The ad-monitoring code captures the request. Code analyzes the request to determine whether the attempted action (i.e., the network request) would meet the maximum rate for network requests if allowed to continue, and/or whether the network request is according to define type and/or format. The code determines that the action is an attempted action that may be prevented by delaying the request until a time where sending the request will not exceed the maximum rate of requests optionally according to the type and/or format. Alternatively or additionally, the web browser media object is defined in a holding state when the original network request time of response cannot be determined (and/or assumed) and the web browser media object is able to wait at a certain time. The code queues an action to send the network request at the certain time. The code sends the network request. When a response is received, the response is passed back to the web browser media object through the proper instrumented XMLHttpRequest object callback. Data associated with the action and/or network request, and/or decision parameters and/or metrics may be reported and/or analyzed (e.g., manually by a human administrator and/or automatically by analysis code) to determine whether the code made the correct decision.

Example 4 relates to a web browser media object that injects disallowed third party objects. The set-of-rules define a prohibition of injection of object elements from predefined URLs (e.g., a list of URLs), or alternatively or additionally, the set-of-rules define a set (e.g., list) of URLs from which objects are allowed to be injected. The web browser media object injects third party object(s) in a manner in which instrumentation (e.g., ad-monitoring code) fails to capture the injection action. The ad-monitoring code, which monitors the state of the DOM, detects the change due to the injected code, and determines that the action is not allowed according to the set-of-rules. Code determines that the detected action is a reported action, and therefore cannot be prevented. The code determines that the third party object(s) is to be removed from the true DOM tree, and the code removes the third party object(s) from the DOM. The code may determine that one or more of the following are to be removed to ensure continued correct functionality and/or allowed state of the web browser media object (the code may perform the removal and/or deletion): third party object(s), the web browser media object, and/or other related objects. Data associated with the injection and/or decision parameters and/or metrics may be reported and/or analyzed (e.g., manually by a human administrator and/or automatically by analysis code) to determine whether the code made the correct decision.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant ad-monitoring codes will be developed and the scope of the term ad-monitoring code is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad-scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A computer-implemented method for monitoring of web browser media object(s) received in response to a web browser request at a web browser rendering a web page, the method executed by at least one processor of a client terminal in network communication with a web server hosting the web page, the method comprising:

loading by a web browser running on the client terminal, ad-monitoring code with the web page, wherein the web page includes at least one designation for placement of at least one web browser media object received in response to a web browser request by the web browser;

monitoring, using the ad-monitoring code, at least one of attempted actions and attempted events defining a plurality of components of a multi-media advertisement provided by an ad-server for dynamic loading and execution by the at least one web browser media object on the client terminal;

identifying a deviation from a set-of-rules according to an analysis of the monitored at least one of attempted actions and attempted events, wherein the set-of-rules define allowable components of the multi-media advertisement when executed on the client terminal, and prohibited components of the multi-media advertisement when executed on the client terminal;

wherein a common set-of-rules is defined for the web page for implementation by each client terminal accessing the web page, the set-of-rules are stored in association with the web server hosting the web page; and generating a virtual reply that includes false data in response to the deviation by execution of the at least one of attempted actions and attempted events on a virtual DOM that simulates the DOM without executing the at least one of attempted actions and attempted events on the DOM;

wherein in response to the virtual reply received by the at least one web browser media object, the at least one of attempted actions and attempted events that deviate from the set-of-rules are prevented from executing the prohibited components of the multi-media advertisement on the client terminal, and the at least one of attempted actions and attempted events that adhere to the set-of-rules are allowed to continue execution of the allowable components of the multi-media advertisement on the client terminal;

wherein the set-of-rules define playing one type of media as an allowable component of the multi-media advertisement and another type of media as a prohibited component of the multi-media advertisement, wherein the prohibited component is blocked while the allowable component is allowed to be presented.

2. The computer-implemented method of claim 1, wherein the at least one web browser media object is a programmatic advertisement provided by an ad-server for dynamic loading with the web page by the web browser.

3. The computer-implemented method of claim 1, wherein the web page includes a plurality of designations each for placement of at least one web browser media object, wherein the web page includes a plurality of ad-monitoring code instruction instances each for loading with an associated respective web browser media object, wherein the monitoring is performed by each ad-monitoring code instance of the associated respective web browser media object, and wherein the identification of the deviation of each respective web browser media object is performed according to a respective set-of-rules defined for each respective web browser media object.

4. The computer-implemented method of claim 3, wherein each ad-monitoring code instance monitors the associated respective web browser media object without monitoring other content of the web page or other web browser media objects being monitored by other ad-monitoring code instances.

5. The computer-implemented method of claim 3, wherein each ad-monitoring code instance and associated web browser media object are loaded together within a respective frame of the web page, wherein the ad-monitoring code instance monitors the at least one of attempted actions and attempted events from the associated web browser media object within the respective frame.

6. The computer-implemented method of claim 5, wherein the set-of-rules define the maximum loaded size of the web browser media object, and identifying comprises identifying a deviation above the maximum loaded size of the loaded web browser media object.

7. The computer-implemented method of claim 1, wherein the set-of-rules define undesired parameters leading to a degradation of a user experience of a user using the web browser to access the web page.

8. The computer-implemented method of claim 1, wherein the set-of-rules includes at least one member of the group consisting of: statistically significant network usage, statistically significant processing resource utilization, statistically significant user noticeable slow-down in loading of the web page, statistically significant user noticeable slow-down in execution of other applications running on the client terminal, and detection of malware.

9. The computer-implemented method of claim 1, further comprising recursively monitoring loading of sub-frames within a loaded parent frame of the web page, and recursively monitoring the web browser media object within the loaded sub-frame and parent frame.

10. The computer-implemented method of claim 1, further comprising monitoring to detect changes to the document object model (DOM) of the web page.

11. The computer-implemented method of claim 10, further comprising at least one of: allowing actions that do not violate the set-of-rules to pass to the DOM, and blocking actions that violate the set-of-rules.

12. The computer-implemented method of claim 1, wherein monitoring comprises monitoring network activity associated with the monitored web browser media object.

13. The computer-implemented method of claim 1, wherein the set-of-rules is designed to detect at least one member of the group consisting of: web browser media object associated with an advertiser bot, frequency capping, and re-targeting.

14. The computer-implemented method of claim 1, wherein the set-of-rules define prohibited activity as activation of sound by the web browser media object.

15. The computer-implemented method of claim 1, further comprising identifying the at least one of attempted actions and attempted events executed by each component of the web browser media object to identify which certain component of the web browser media object caused the deviation from the set-of-rules.

16. The computer-implemented method of claim 1, wherein monitoring comprises monitoring each technological platform implementation of the web browser media object.

17. The computer-implemented method of claim 16, wherein the technological platform implementation includes at least one member of the group consisting of: at least one programming language used to create the web browser media object, DOM representation of the web browser media object, interface used by the web browser media object, and network activity due to the web browser media object.

18. The computer-implemented method of claim 1, further comprising creating a call chain of components of each web browser media object.

19. The computer-implemented method of claim 18, wherein the call chain is created by analyzing call stacks to identify the connectivity between the components of the web browser media object.

20. The computer-implemented method of claim 1, further comprising adding an event handler that detects a mutation event to a DOM of the web page and analyzing a stack trace to determine a component of an web browser media object associated with code that caused the mutation.

21. The computer-implemented method of claim 1, wherein the web browser media object includes a plurality of links to a plurality of resources located on at least one remote server, wherein the resources include instructions for execution by the web browser of the client terminal, wherein the resources are arranged in a hierarchy such that a first resource includes instructions to execute at least one second resource, further comprising tracking loading of each of the plurality of resources and creating a dependency graph representing the loading relationship between resources, wherein nodes of the graph represent web browser media object resources.

22. The computer-implemented method of claim 21, wherein tracking loading comprises at least one member selected from the group consisting of: time of loading relative to the start of the loading process of the web page, the location of the web browser media object resource in the web page relative to the root of a DOM of the web page.

23. The computer-implemented method of claim 21, wherein the dependency graph includes weights assigned between nodes of the graph representing at least one of the loading time and distance based on the screen location.

24. The computer-implemented method of claim 23, wherein the loading relationship of resources of web browser media objects of the web page are analyzed for each loading session of the web page and added to a common graph created for the web browser media object representing an average of weights based on multiple sessions.

25. The computer-implemented method of claim 24, further comprising applying a machine learning method to the graph to identify web browser media object-resources violating the set-of-rules.

26. The computer-implemented method of claim 1, further comprising blocking the at least one web browser media object identified as deviating from the set-of-rules by automatically removing the designation for requesting the at least one web browser media object from the code of the web page.

27. The computer-implemented method of claim 1, further comprising transmitting the virtual reply to the at least one web browser media object, wherein the virtual reply enables the at least one web browser media object to continue execution without deviating from the set-of-rules.

28. The computer-implemented method of claim 1, wherein the set-of-rules define playing a visual video on a display as the allowable component of the multi-media advertisement, and the set-of-rules define sound as the prohibited component of the multi-media advertisement, wherein a sound component of the multi-media advertisement is blocked while a visual component of the multi-media advertisement is allowed to continue playing on the display.

29. A system for monitoring web browser media object(s) received in response to a web browser request at a web browser rendering a web page, comprising:
a client terminal, comprising:
a network interface for connecting to a network;
a program store storing code; and
a processor coupled to the network interface and the program store for implementing the stored code, the code comprising:
code to load ad-monitoring code with the web page, wherein the web page includes at least one designation for placement of at least one web browser media object received in response to a web browser request by the web browser;
code to monitor, using the ad-monitoring code, at least one of attempted actions and attempted events defining a plurality of components of a multi-media advertisement provided by an ad-server for dynamic loading and execution by the at least one web browser media object on the client terminal, to identify a deviation from a set-of-rules according to an analysis of the monitored at least one of attempted actions and attempted events, wherein the set-of-rules define at least one of allowable components of the multi-media advertisement when executed on the client terminal, and prohibited components of the multi-media advertisement when executed on the client terminal, wherein a common set-of-rules is defined for the web page for implementation by each client terminal accessing the web page, the set-of-rules are stored in association with the web server hosting the web page, and generate a virtual reply that includes false data in response to the deviation by execution of the at least one of attempted actions and attempted events on a virtual DOM that simulates the DOM without executing the at least one of attempted actions and attempted events on the DOM, wherein in response to the virtual reply received by the at least one web browser media object, the at least one of attempted actions and attempted events that deviate from the set-of-rules are prevented from executing the prohibited components of the multi-media advertisement on the client terminal, and the at least one of attempted actions and attempted events that adhere to the set-of-rules are allowed to continue execution of the allowable components of the multi-media advertisement on the client terminal, wherein the set-of-rules define playing one type of media as an allowable component of the multi-media advertisement and another type of media as a prohibited component of the multi-media advertisement, wherein the prohibited component is blocked while the allowable component is allowed to be presented.

30. The system of claim 29, further comprising a monitoring server in network communication with the client terminal, the monitoring server comprising a program store storing code, and a processor coupled to the program store for implementing the stored code, the code comprising: code to receive data from the client terminal indicative of the tracking of the loading of each of a plurality of resources of the web browser media object, and code to create a dependency graph for the web browser media object representing the loading relationships between the plurality of resources.

31. A computer program product comprising a non-transitory computer readable storage medium storing program code thereon for implementation by at least one processor of a client terminal in network communication with a web server hosting a web page, for monitoring at least one web browser media object received in response to a web browser request at a web browser rendering the web page, comprising:
program instructions to load by the web browser, ad-monitoring code with the web page, wherein the web page includes at least one designation for placement of at least one web browser media object received in response to a web browser request by the web browser;
program instructions to monitor, using the ad-monitoring code, at least one of attempted actions and attempted events defining a plurality of components of a multi-media advertisement provided by an ad-server for dynamic loading and execution by the at least one web browser media object on the client terminal;
program instructions to identify a deviation from a set-of-rules according to an analysis of the monitored at least one of attempted actions and attempted events, wherein the set-of-rules define allowable components of the multi-media advertisement when executed on the client terminal, and prohibited components of the multi-media advertisement when executed on the client terminal, wherein a common set-of-rules is defined for the web page for implementation by each client terminal accessing the web page, the set-of-rules are stored in association with the web server hosting the web page,
program instructions to generate a virtual reply that includes false data in response to the deviation by execution of the at least one of attempted actions and attempted events on a virtual DOM that simulates the DOM without executing the at least one of attempted actions and attempted events on the DOM; and
wherein in response to the virtual reply received by the at least one web browser media object, the at least one of attempted actions and attempted events that deviate from the set-of-rules are prevented from executing the prohibited components of the multi-media advertisement on the client terminal, and the at least one of attempted actions and attempted events that adhere to the set-of-rules are allowed to continue execution of the allowable components of the multi-media advertisement on the client terminal;
wherein the set-of-rules define playing one type of media as an allowable component of the multi-media advertisement and another type of media as a prohibited component of the multi-media advertisement, wherein the prohibited component is blocked while the allowable component is allowed to be presented.

* * * * *